INVENTOR.
D.D. BUTTOLPH

July 14, 1964
D. D. BUTTOLPH
3,140,573
FILM POSITIONING APPARATUS
Filed Oct. 5, 1961
3 Sheets-Sheet 2
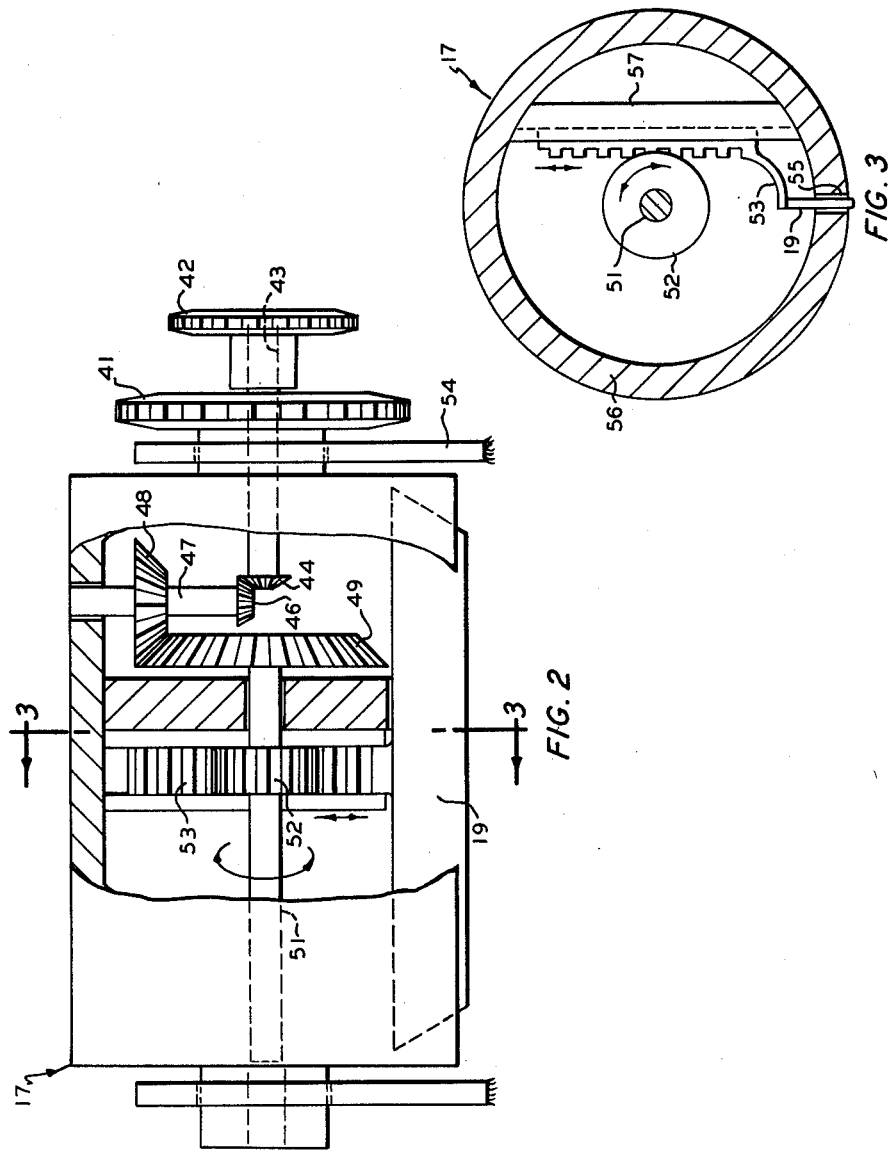
INVENTOR.
D.D. BUTTOLPH
BY
*Young & Quigg*
ATTORNEYS July 14, 1964

D. D. BUTTOLPH 3,140,573

FILM POSITIONING APPARATUS

Filed Oct. 5, 1961

INVENTOR.
D.D. BUTTOLPH

BY

Young & Quigg
ATTORNEYS

3,140,573
FILM POSITIONING APPARATUS
Doyle D. Buttolph, Bartlesville, Okla., assignor to Phillips Petroleum Company, a corporation of Delaware
Filed Oct. 5, 1961, Ser. No. 143,236
4 Claims. (Cl. 53—51)

This invention relates to apparatus for proper positioning of a printed plastic film being sealed to a plastic or plastic-coated container to form the cover thereof. In another aspect it relates to a method for automatically compenasting for variations in the labels printed on the film relative to the container so as to maintain correct matching of the printing with the container prior to sealing and cutting operations.

The prior art discloses methods for forming and sealing covers to containers, and means to maintain the necessary operational synchronization between the two lines being joined. All of these devices appear to be characterized by positive drive of the strip from which the covers are formed, coupled with initial manual adjustment for the proper synchronization. Even then, such manually set "indexing" remains accurate only so long as nothing varies.

In the newer food packaging process of heat sealing covers cut from flexible film onto thermoformed containers, it is important to maintain high handling speeds. A rate of container sealing as high as 600 per minute has been contemplated. At such rates, precutting or stamping the cover sheet prior to sealing greatly complicates the sealing operation, by requiring the handling of individual covers which are to be matched with the containers. Thus, it is desirable where employing flexible films as a cover sheet source to handle them as a continuous sheet during positioning. A portion of the film is sealed to the package, and then cut to form an individual cover.

The use of a flexible continuous cover film through the sealing step introduces the problem of positioning the printed labels relative to the containers to be sealed. In a high speed sealing process, the continuous film is under tension and there will be, at times, a tendency toward film stretching. Also, there will be inadvertent variations in the printing of the label. The net effect on certain of the closed containers is that label is not centered and therefore not readily acceptable by appearance-conscious purchasers. Moreover, the prior art devices are simply not adapted to automatically compensate for these variations in synchronization.

It is an object of the invention to provide apparatus which automatically compensates for stretching in flexible film and for variations in the labels printed thereon to maintain proper positioning of the label cover on the container to be sealed.

It is another object of the invention to provide synchronization means combined with sealing means in which the synchronization means automatically compensates for variations in label position to assure proper register of the cover on the containers being sealed.

These and other objects, modifications and alterations of this invention will become apparent to those skilled in the art without departing from the scope and spirit of this invention and it should be understood that the latter is not necessarily limited to the aforementioned discussion and accompanying drawing.

The foregoing objects are achieved in one aspect by providing a label positioning apparatus having, in series: feeding means for a continuous flexible film; drum means adjacent said printed film and disposed between said feeding means and a film sealing means; blunt edged means within said drum means reciprocably extensible therefrom, and contacting said film thereby permitting variable depressing said film; means to maintain the continuous film in tension; conveying means for containers to be sealed by said film; and means which automatically actuate said blunt edged means in either direction to compensate for variations in position of the printed label and maintain proper centering of the same on the sealed containers.

For the purpose of more clearly describing the invention and providing a better understanding thereof, reference is made to the accompanying drawings, in which like parts have been designated with like reference numerals:

FIGURE 2 is an elevational view in full section showing the aligning drum and film depressing knife;

FIGURE 3 is another elevational view, in partial section, taken along line 3—3 of FIGURE 2.

Figure 1:
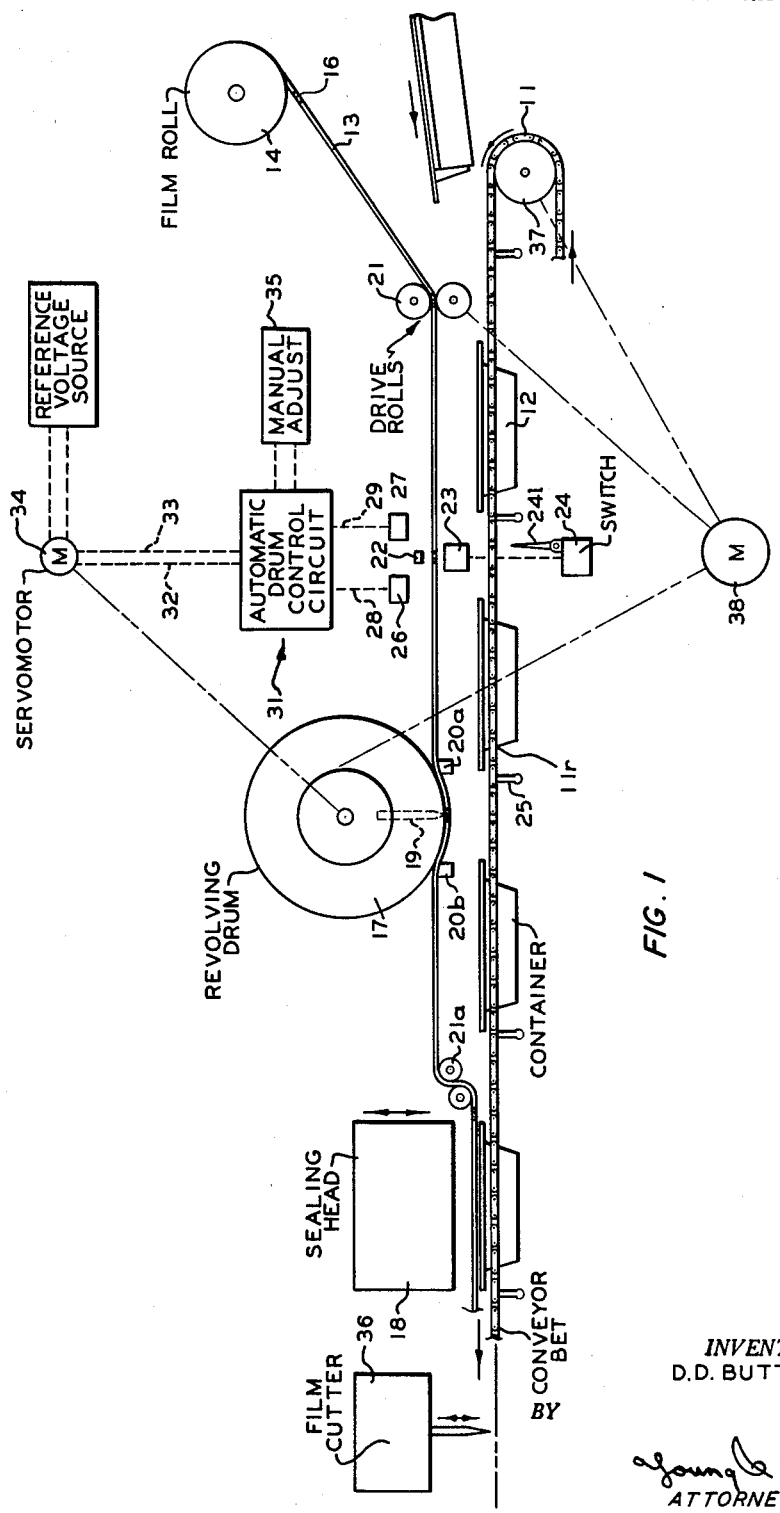
FIGURE 1 is a diagrammatic illustration of apparatus for synchronized heat sealing of flexible printed film to formed containers.

Referring now to the drawing, wherein like parts are designated with like reference numerals, and to FIGURE 1 in particular, there is shown a chain conveyor belt 11 having a plurality of receptacles such as 11r for conveying a number of spaced, formed containers, such as 12, at a uniform speed. For detailed disclosure of a suitable conveyor belt system, see my copending application Serial No. 97,908, filed March 23, 1961. A flexible, continuous film 13, is drawn from a roll 14 at the same linear speed as the conveyor chain. Film 13 has previously been preprinted with a repetitive series of package labels of a desired design, each of which is adapted to the size and contents of the containers 12 which are to be sealed. Between each of the labels is a registration, or indexing mark, such as 16, for use in aligning the label.

A specially designed, hollow rotating drum 17 is disposed adjacent to film 13, between the film feeding roll 14 and reciprocative sealing head 18. In the position of the drum shown, radially extending from drum 17 is a reciprocable, blunt edge means, such as knife 19, which makes contact with moving film 13, once with each drum revolution, as shown. In its normal position, means 19 will have about half of its protrudable length extending from drum 17. In this manner, knife 19 has equal travel available in either direction, thereby permitting it to depress the continuous film as it passes thereunder to a variable depth, as directed by the automatic knife positioning components, which will be subsequently described. Guides 20a and b are positioned on a horizontal plane with drive rolls 21 and directional roll 21a to provide support for film 13 when acted upon by means 19. In actuality guides 20a and 20b are spaced sufficiently far from the periphery of drum 17 so that the arc of travel of knife 19, at its most extended position, would clear these guides. The film is maintained in tension as it passes through drive rolls 21, under the drum 17 and to sealing head 18.

The film passes horizontally above containers 12, and in close proximity thereto, then between said pair of light sources 22 and 23 disposed about the taut film. Bulb 22 is a constant light source to keep the amperage system in balance while light source 23 is off. Source 23 is a high candle power light switched on by lugs, such as 25, tripping lever 24l of said switch automatically via switch 24 to check label alignment. Disposed above sources 22 and 23 are a pair of photoelectric cells 26 and 27, which are in electrical communication, via leads 28 and 29, respectively, with an automatic servomotor control circuit, generally designated 31. A suitable cell for use in this invention is an International Rectifier Corp. Type DP3 photoelectric cell.

Circuit 31 passes a drive signal, via leads 32 and 33, to servomotor 34 to drive motor 34 either clockwise, or counterclockwise, in accordance with the phase of the signal. A manual registration position adjust 35 is connected to circuit 31. A suitable servomotor is the high speed, Minneapolis-Honeywell #362479-1. Motor 34 is connected to one shaft of drum 17 by gears, belts or chain, and consequently, through a mechanical linkage (shown in FIGURE 2) drives knife edge 19 either up or down. The variable depressing of the continuous film shifts the film slightly forward or backward, relative to its direction of travel, until the registration mark 16 intercepts the light beam equally, and the motor driving circuit becomes balanced. The label on the film is now properly aligned relative to the package to be sealed, and both containers and film continue at synchronized speed under the sealing head 18 for the sealing operation, followed by cutter 36, to form an independent, closed container.

Since drive rolls 21 feed film 13 at a speed equal to the linear speed of conveyor belt 11, the film speed remains constant until knife 19 "creases" the film, at which time this creasing overcomes the frictional hold of rolls 21 to pull film 13 forward at a momentarily increased rate, which moves mark 16 slightly forward.

It will be noted that drum 17, drive rolls 21, and conveyor belt drive 37, are all linked to main drive motor 38. Thus, the speeds of these three elements are readily synchronized by selection of the proper gear ratios.

In FIGURE 2, drum 17 is shown in partial section. Sprocket 41, which rotates the drum is mechanically linked with main motor 38 of FIGURE 1. Sprocket 42 is attached to shaft 43, which operates the differential gears. Gear 44 on the inner end of shaft 43 engages gear 46 on shaft 47. The ratio of gear 44 to gear 46 is normally one to one. Shaft 47 is also pinned to gear 48 intermediate its other end. Gear 48 drives gear 49 on shaft 51. The ratio of gear 48 to gear 49 is approximately one to two. Pinion 52, also on shaft 51, raises or lowers rack 53, depending on its direction of rotation. Bearing plate 54 supports the shaft of sprocket 41.

In FIGURE 3, the relationship of elements 51, 52 and 53 is set forth more clearly. Knife 19 is attached at its upper end to the arm of rack 53, and extends radially through opening 55 in the wall 56 of drum 17. Fixed member 57 provides a groove for retaining rack 53 in vertical alignment. It is evident that depending upon the direction in which sprocket 42 is rotated by servomotor 34, knife 19 will be moved in or out of drum 17 in a radial path.

Figure 4:
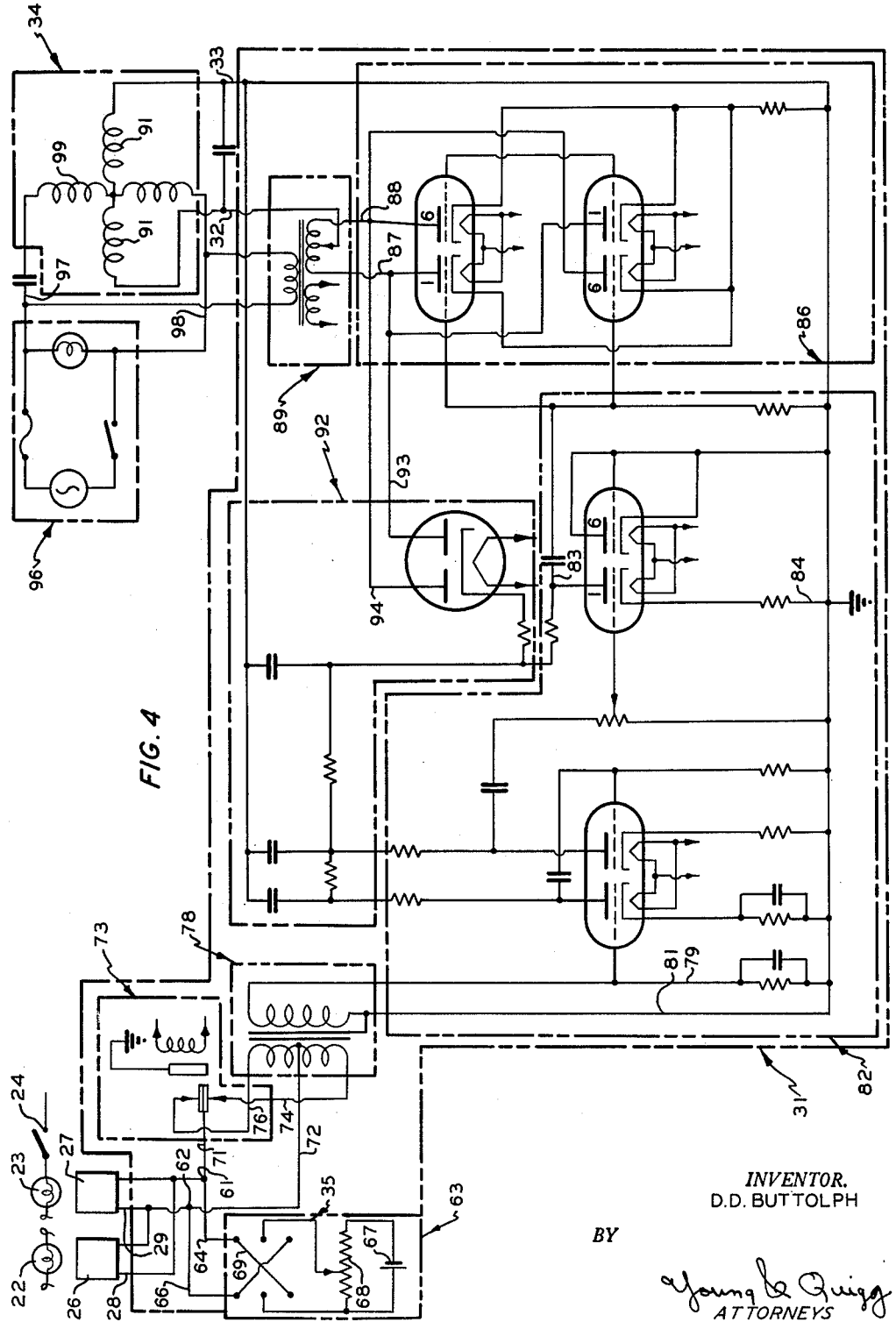
FIGURE 4 is a schematic view of the circuitry of the photoelectric cells and servomotor control system.

In FIGURE 4, is shown the circuitry for the servomotor control system. Light source 22 is received in equal intensity by photocells 26 and 27 continuously to keep the amperage system in balance. At the time for checking the position of the registration mark on the film passing under the photocells, a switch 24 is automatically closed by lugs 25 of FIGURE 1 or the like, on conveyor belt 11, positioned at intervals corresponding to the spacing of the containers thereon. If the registration mark is centered between the cells, high candle power light source 23 transmits a light beam that falls with equal intensity on photocells 26 and 27. As the cells are rigged to balance out one another when receiving equal light, no voltage is developed across them. Thus, no electrical signal is being transmitted that would actuate the servomotor control system, which, in turn, drives knife 19. The film proceeds along, properly aligned, to the sealing and cutting steps.

In one situation where the film has been pulled forward slightly so that the label is not properly positioned relative to the container, the registration mark will not be centered between the cells, causing more light to be transmitted to cell 27 than to cell 26. The resulting light differential generates a D.C. voltage, which actuates the knife drive system in one direction. Alternatively, if the mark is lagging the central position between the cells, this causes more light to be transmitted to cell 26 than to cell 27. This light differential also generates a D.C. voltage, opposite in polarity to the first situation, actuating the knife drive system to operate in the reverse direction.

Within control circuit 31 proper, when cell 27 is receiving more light, indicating the registration mark is leading its proper position, then point 61 is electrically positive relative to point 62.

A manual registration position adjust component 63 connects with points 61 and 62 via leads 64 and 66. Component 63 comprises a D.C. voltage source 67, a variable resistor 68, and a polarity reversing switch 69. The closing of the pole of the switch connecting with the terminal of lead 64 simulates one position of imbalance of the two P.E. cells; while closing of the other pole of switch connecting with the terminal of lead 66 simulates the alternate position of imbalance of the two cells. With this adjustment, rebalancing of the automatic control circuit can be attained, should the registration mark be so far off center as to carry the knife to the limit of its travel without achieving alignment of the mark.

Lead 71 connects point 61 with a converter, generally designated 73, which develops a 60 cycle signal from the input D.C. voltage. The resulting signal leaves the converter via leads 74 and 76, entering an isolation transformer 78. Lead 72 connects point 62 directly with the center tap of transformer 78. Leads 79 and 81 pass from transformer 78 through a three-stage voltage amplification means, generally designated 82. Means 82 comprises two vacuum tubes, typically 12AX7's, using both triode sections of the first tube, and one triode section of the second tube. Leads 83 and 84 from pins 1 and 6 of the third triode of amplifier 82 connect to the terminals of a servo power amplifier generally designated 86.

Amplifier 86 comprises two parallel connected vacuum tubes, typically 12AU7's. Leads 87 and 88 pass from pins 1 and 6 of these tubes, connect with the terminals of a power transformer 89, such as a Stancor P6348. The center tap of transformer 89 supplies a driving signal via lead 32 to the signal (red) winding 91 of servomotor 34.

A D.C. power supply and filter section, generally designated 92, connects with leads 87 and 88, via leads 93 and 94, respectively.

Reference voltage from power circuit 96 is applied via leads 97 and 98 to the reference winding 99 of servomotor 34.

As the driving signal is out of phase with the reference signal (leading), the shaft of the servomotor will rotate in the direction that will actuate drum 17 to drive knife means 19 upward, so that drive knife 19 pulls less film forward with each drum rotation. Thus registration marks 16 will move back relative to light source 23, permitting progressively more light to fall on cell 26. When the driving and reference signals come into phase, the motor will cease driving. At this time the registration mark will have become aligned equidistant between the P.E. cells.

In the alternate situation, the mark 16 is lagging its proper position, thus more light is transmitted to cell 26 and less to cell 27. Thus point 62 is now electrically positive relative to point 61. The generated D.C. voltage is transmitted through the circuitry just as previously described, except that the driving signal passes from lead 32 also out of phase, but now lagging the reference signal. The servomotor shaft thus rotates in the opposite direction, driving knife 19 downward, and permitting the creased film to be drawn progressively forward from the driving rolls. When the driving and reference signals again come into phase, the servomotor ceases to drive the knife downward. Again the marks will be aligned equidistant between the P.E. cells, indicating the label is properly positioned for sealing.

In either situation, the knife will retain its previous position during successive drum rotations until the detection system indicates another alignment is necessary in either direction.

Various modifications and alterations of this invention will become apparent to those skilled in the art without departing from the scope and spirit of this invention and it should be understood that the latter is not necessarily limited to the aforementioned discussion.

I claim:

1. An apparatus for properly positioning a label printed on a continuous flexible film relative to a formed container before sealing the former to the latter, comprising: feeding means for said flexible film; rotating drum means adjacent said film and disposed between said feeding means and a film sealing means; blunt edged means reciprocably extensible from within said drum means for contacting said film, thereby permitting variably depressing of said film, said blunt edged means normally positioned about midway between the two extremes of its travel; conveying means for containers to be sealed by said film; means for detecting the alignment of said label relative to said container; and means responsive to said detecting means which automatically actuate a means to drive said blunt edged means in either direction to automatically compensate for variations in the position of the label, thereby maintaining proper centering of the same as said film is sealed to said formed container.

2. The apparatus of claim 1 wherein said detecting means comprises a pair of photoelectric cells parallel and spaced apart on one side of said film; a light source transmitting a light beam through said film to said cells; an opaque registration mark printed on said film; and electrical means connected to said cells to generate a voltage when the intensity of the light falling on each of said cells varies due to unequal splitting of said light beam by said registration mark.

3. The apparatus of claim 2 wherein said responsive means comprises a converter for changing the output voltage of said photocells to a cyclic signal; transformer means for stepping up said cyclic signal; amplification means for amplifying said stepped up cyclic signal; servo power amplifier means for receiving the amplified signal; power transformer for receiving the further amplified signal and providing an output signal which is connected to the signal winding of said motor; and a power circuit for supplying a reference signal to the reference winding of said motor means.

4. An apparatus for properly positioning a label printed on a continuous flexible film relative to a formed container before sealing of the former to the latter, comprising: feeding means for said flexible film; rotating drum means adjacent said film and disposed between said feeding means and a film sealing means; blunt edged means reciprocably extensible from within said drum means for contacting said film, thereby permitting variably depressing of said film, said blunt edged means normally positioned about midway between the two extremes of its travel; conveying means for containers to be sealed by said film; means for detecting the alignment of said label relative to said container, said detecting means comprising a pair of photoelectric cells parallel and spaced apart on one side of said film; a light source transmitting a light beam through said film to said cells, and electrical means connected to said cells to generate a voltage when the intensity of light falling on each of said cells varies due to unequal splitting of said light beam by an opaque registration mark printed on said film; and means responsive to said detecting means for automatically actuating a motor means to drive said blunt edged means in either direction to automatically compensate for variations in the position of the label thereby maintaining proper centering of the same as said film is sealed in said formed container.

References Cited in the file of this patent

UNITED STATES PATENTS

| | | |
|---|---|---|
| 2,105,185 | Degman | Jan. 11, 1938 |
| 2,296,142 | Campbell | Sept. 15, 1942 |
| 2,375,451 | Waters | May 8, 1945 |
| 2,977,730 | Ardner | Apr. 4, 1961 |